(12) United States Patent
Arunagirinathan et al.

(10) Patent No.: US 10,242,371 B2
(45) Date of Patent: Mar. 26, 2019

(54) INFORMATION HANDLING SYSTEM UTILIZING A SMART LOGO TO PROVIDE PROPERTIES OF THE INFORMATION HANDLING SYSTEM

(71) Applicant: Dell Products, LP, Round Rock, TX (US)

(72) Inventors: Aravindan Arunagirinathan, Bangalore (IN); Krishna Devadas Murali, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 387 days.

(21) Appl. No.: 14/990,241

(22) Filed: Jan. 7, 2016

(65) Prior Publication Data

US 2017/0201514 A1 Jul. 13, 2017

(51) Int. Cl.
*G06Q 30/00* (2012.01)
*H04L 29/06* (2006.01)

(52) U.S. Cl.
CPC ......... *G06Q 30/0185* (2013.01); *H04L 63/08* (2013.01); *H04L 63/107* (2013.01)

(58) Field of Classification Search
CPC .............. H04L 63/0876; G06Q 30/0185
USPC ........................................................... 726/7
See application file for complete search history.

(56) References Cited

U.S. PATENT DOCUMENTS

| 2002/0195493 | A1 | 12/2002 | Dell |
| 2006/0136726 | A1* | 6/2006 | Ragnet .................. G06F 21/608 713/171 |
| 2007/0229225 | A1* | 10/2007 | Zaretsky ............. G06F 11/0772 340/10.1 |
| 2008/0116278 | A1* | 5/2008 | Epshteyn .......... G06F 17/30879 235/462.25 |
| 2008/0195856 | A1* | 8/2008 | Ford ................... G06F 17/5054 713/100 |
| 2012/0128240 | A1 | 5/2012 | Rothschild |
| 2016/0212223 | A1* | 7/2016 | Yang ................... H04L 61/2015 |

\* cited by examiner

*Primary Examiner* — Teshome Hailu
(74) *Attorney, Agent, or Firm* — Larson Newman, LLP

(57) ABSTRACT

An information handling system includes a plurality of components, and a logo device configured to communicate with one of the components. The logo device includes a logo, a memory, a communication device, and a processor. The logo is on an external surface of the logo device, and is visible from outside of the information handling system. The memory stores real-time status and error logs of the first information handling system. The communication device receives authentication information from a second information handling system in response to the second information handling system being within a first distance of the logo device. The processor detects that a second information handling system is within the first distance of the communication device, verifies the authentication information, and provides the real-time status and the error logs for the first information handling system in response to verifying the authentication information.

17 Claims, 5 Drawing Sheets

INFORMATION HANDLING SYSTEM UTILIZING A SMART LOGO TO PROVIDE PROPERTIES OF THE INFORMATION HANDLING SYSTEM

FIELD OF THE DISCLOSURE

The present disclosure generally relates to information handling systems, and more particularly relates to an information handling system utilizing a smart logo to provide properties of the information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems may process events, such as communications over a network and online customer purchases.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
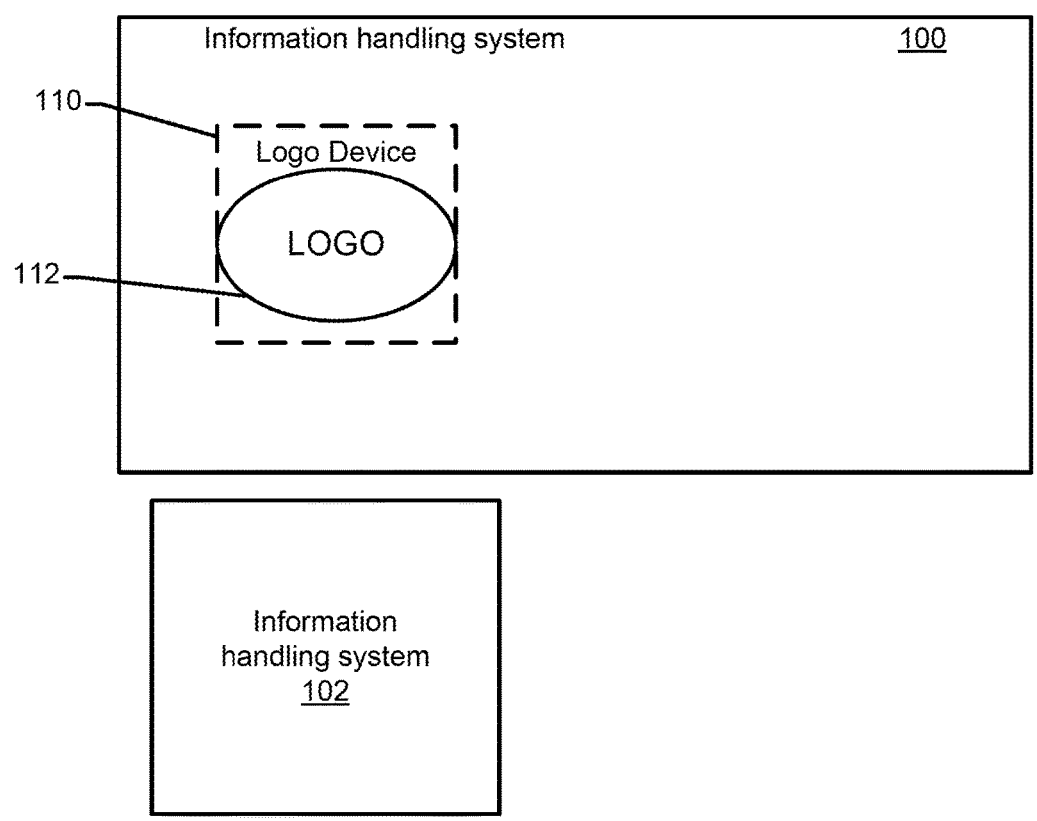
FIG. 1 is a block diagram showing an external view of an information handling system including a logo to provide properties of the information handling system according to an embodiment of the present disclosure.

FIG. 1 illustrates block diagrams of information handling systems 100 and 102. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system 100 is illustrated in FIG. 1, the term "system" shall also be taken to include any collection of systems or sub-systems that individually or jointly execute a set, or multiple sets, of instructions to perform one or more computer functions.

The information handling system 100 includes a logo device 110, which in turn includes a logo 112. The logo 112 is integrated, such as in physical communication, with an exterior surface of the logo device 110. In an embodiment, the logo device 110 is integrated within the information handling system 100. In one embodiment, the logo 112 is the only portion of the logo device 110 that is visible by an individual from the outside of the information handling system 100. In another embodiment, both the logo 112 and the exterior surface of the logo device 110 can be visible by an individual from the outside of the information handling system 100. An individual can therefore utilize the logo 112 to identify the location of the logo device 110.

The logo device 110 can store properties of the information handling system 100 at a memory of the logo device. In an embodiment, the properties of the information handling system 100 are stored at the memory during a manufacturing process of the information handling system. The properties can include a service or asset tag, a model number, a serial number, or the like of the information handling system 100. The logo device can also store real-time status and error logs of the information handling system 100, and can store contact information for a manufacturer of the information handling system. In an embodiment, the real-time status and the error logs can be associated with other components within the information handling system 100, and the real-time status and the error logs can be continuously updated.

During operation, the information handling system 102 can be placed within a first distance of the logo 112. In an embodiment, the first distance can be any distance within the distance of a communication range for the logo device 110. For example, the second information handling system 102 can be within the first distance from the logo device 110 in response to the second information handling system 102 being tapped, or placed in physical communication, with the logo 112. The logo device 110 can then provide the properties, real-time status, and error logs of the first information handling system 100, and the contact information for a manufacturer of the information handling system 100 to the second information handling system 102, which in turn can utilize this information to perform one or more operations as will be described in greater detail with respect to FIG. 2 below.

Figure 2:
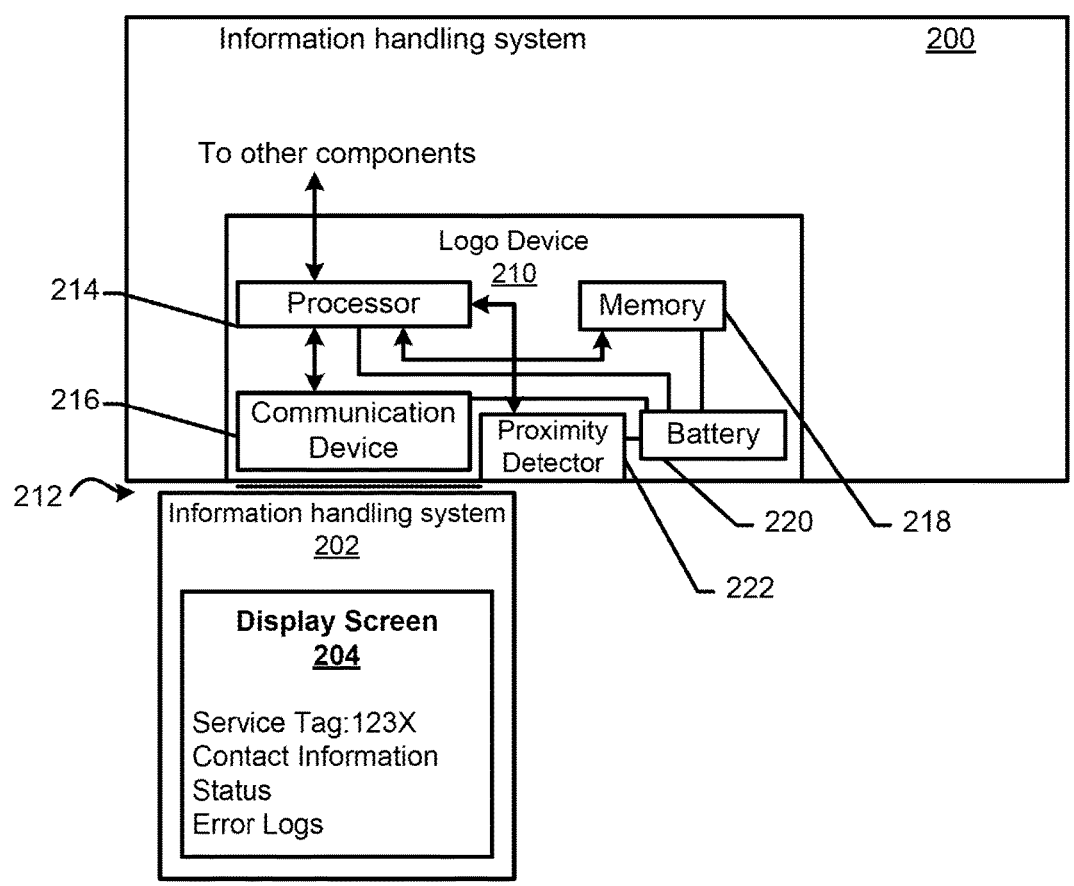
FIG. 2 is a block diagram showing an internal view of the information handling system according to an embodiment of the present disclosure.

FIG. 2 illustrates a block diagram showing an internal view of an information handling system 200 and further illustrates a block diagram of an information handling system 202 according to an embodiment of the present disclosure. The information handling system 200 includes a logo device 210 and other components, such as the components discussed in FIG. 5 below. The information handling system 202 includes a display screen 204. The logo device 210 includes a logo 212, a processor 214, a communication device 216, a memory 218, a battery 220, and a proximity detector 222. The logo 212 is integrated with an exterior surface of the logo device 210. Thus, the logo 212 can be visible to an individual from the exterior of the information handling system 200, which the individual can utilize to identify the location of the logo device 210 within the information handling system. The processor 214 is in communication with the communication device 216, the memory 218, the battery 220, the proximity detector 222, and the other components of the information handling system 200.

The battery 220 can be utilized to provide power to the processor 214, the communication device 216, the memory 218, and the proximity detector 222, such that the processor can communicate with a processor of the information handling system 202 via the communication device 216 while the other components of the information handling system 200 are powered off/down. In an embodiment, the battery 220 can be a rechargeable battery that is recharged while the information handling system 200 receives power from an external source. In an embodiment, the processor 214, the communication device 216, the memory 218, and the proximity detector 222 can be provided with power from a power supply within the information handling system 200 while the information handling system is powered on, and then can receive power from the battery 220 when the information handling system 200 is powered down.

In an embodiment, the communication device 216 can communicate with the information handling system 202 via any form of wireless communication, such as Bluetooth, a local area wireless network utilizing a Wireless Fidelity (WiFi) communication protocol, or the like. In an embodiment, the information handling system 202 can be a portable information handling system, such as a smart telephone, a tablet computer, a laptop computer, a wearable device, or the like.

During operation, the processor 214 can receive properties of the information handling system 200 that can be used to identify the information handling system, and the processor can store these properties in the memory 218. In an embodiment, processor 214 can receive the properties of the information handling system 200 during a manufacturing process of the information handling system. These properties can include a service or asset tag, a model number, a serial number, or the like of the first information handling system 200. Additionally, the processor 214 can receive real-time status and error logs of the first information handling system 200, and can store the real-time status and error logs in the memory 218. In an embodiment, the real-time status and the error logs can be associated with other components within the information handling system 200, and can be continuously updated during the operation of the information handling system. For example, the real-time status can include a current processing device usage, available memory space, internal temperatures, or the like for the information handling system 200. The processor 214 can also receive contact information for a manufacturer of the information handling system 200, and can store the contact information in the memory 218. In an embodiment, processor 214 can receive the contact information during a manufacturing process of the information handling system 200.

The information handling system 202 can be placed within a first distance of the logo 212. In an embodiment, the first distance can be any distance within a distance of a communication range for the communication device 216. For example, the second information handling system 202 can be within the first distance from the logo 212 in response to the second information handling system 202 being tapped, or placed in physical communication, with the logo, being held within a few centimeters of the logo, being held within a few inches of the logo, or the like. The proximity detector 222 can determine when the information handling system 202 is within the first distance, and can provide a detection signal to the processor 214. The processor 214 can then cause the communication device 216 to receive an initialization signal from the information handling system 202.

In an embodiment, the information handling system 202 can continuously broadcast the initialization signal, can broadcast the initialization signal in response to a request from an individual, or the like. In an embodiment, the initialization signal can include authentication information for the information handling system 202. The communication device 216 can provide the authentication information to the processor 214, which in turn can verify the authentication information. For example, the processor 214 can verify the authentication information received from the information handling system 202 by comparing the received authentication information to authentication information stored in the memory 218. If the received authentication information matches the stored authentication information, the processor 214 can verify the received authentication information and the information handling system 202. Therefore, only trusted information handling systems can communicate with the processor of the logo device 210.

After verifying the authentication information, the processor 214 can provide, via the communication device 216, the properties, the real-time status, and the error logs of the first information handling system 200, and the contact information for a manufacturer of the information handling system 200 to the information handling system 202. The information handling system 202 can then display the properties of the information handing system 200, and the status information of the components within the information handling system 200 on the display screen 204. For example, the information handling system can display the service tag of the information handling system 200, the current processor usage, the available memory space, or the like.

In an embodiment, one or more of the components within the information handling system 200 could have an error or failure, which in turn may cause the information handling system 200 to be powered off. The processor 214 can receive the error logs for the failures prior to the information handling system 200 powering down, and can store the error logs in the memory 218. Thus, the information handling system 200 may be powered off when the information handling system 202 is placed within the first distance from the logo 212. The battery 220 can provide power to the components of the logo device 202, such that the processor 214 can provide the error logs and contact information for the manufacturer to the information handling system 202.

When the information handling system 202 receives the error logs, the information handling system 202 can automatically search the error logs to determine whether the information handling system 200 had an error or failure and whether that error resulted in the information handling system 200 being powered down. If the information handling system 202 determines that an error has occurred, the information handling system 202 can then search the received contact information to determine a telephone number for customer service of the manufacturer. The information handling system 202 can then dial the telephone number. In an embodiment, the information handling system 202 can automatically dial the telephone number without interaction from an individual, can dial the telephone number after the individual selects the telephone number from the display screen 204, or the like.

The information handling system 202 can then utilize the error logs to determine a type of service telephone call that may be needed. The information handling system 202 can then automatically select proper responses to an automated telephone menu based on the properties, real-time status, and error logs for the information handling system 200. The telephone call can then be routed to a proper queue for a customer service representative based on the responses to the automated telephone menu. While the telephone call is in the queue, the information handling system 202 can communicate with the processor 214 to determine whether any additional diagnostics about the information handling system 200 can be retrieved. If additional diagnostics are retrieved, these diagnostics are provided to the information handling system 202, which in turn provides them to a computer of a customer service representative along with the error logs, status information, and properties for the information handling system 200.

In an embodiment, the information handling system 202 can send the diagnostics and/or the error logs and status information for the information handling system 202 to a computer of the customer service representative based on the contact information. For example, the information handling system 202 can search the contact information for an electronic mail address for the customer service center, individual electronic mail addresses for different customer service representatives, or the like. The customer service representative can then utilize this information handling system while assisting the individual in correcting any problems of the information handling system 200.

In an embodiment, the processor 214 can cause a customer self service portal to be launched by the information handling system 202. In an embodiment, an individual can utilize the customer self service portal to renew a warranty on the information handling system 200, to check assets or components registered with the manufacturer of the information handling system 200, search for support, or the like.

In an embodiment, the information handling system 200 can be a printer, a television, or the like. In response to the information handling system 202 being placed within the first distance of the logo 212, the processor 214 of the logo device 210 can cause the information handling system 200 to power on, to pair with the information handling system 202, or the like. If the information handling system 202 is then placed beyond a second distance that is greater than the first distance, the information handling system 200 can be powered down.

In an embodiment, the logo device 210 and logo 212 can be incorporated into printed materials, such as marketing and promotion posters or banners. In this embodiment, the logo device and/or logo 212 can be a radio-frequency identification (RFID) device that is preloaded with information to cause the information handling system 202 to launch a website associated with the poster or banner. For example, the information handling system 202 can be placed within the first distance of the logo 212 on a poster, and the information handling system 202 can receive contact information that includes a website or telephone number for a company. The information handling system 202 can then search the contact information as described above to detect the website, and can automatically launch an Internet application directed to the website.

Figure 3:
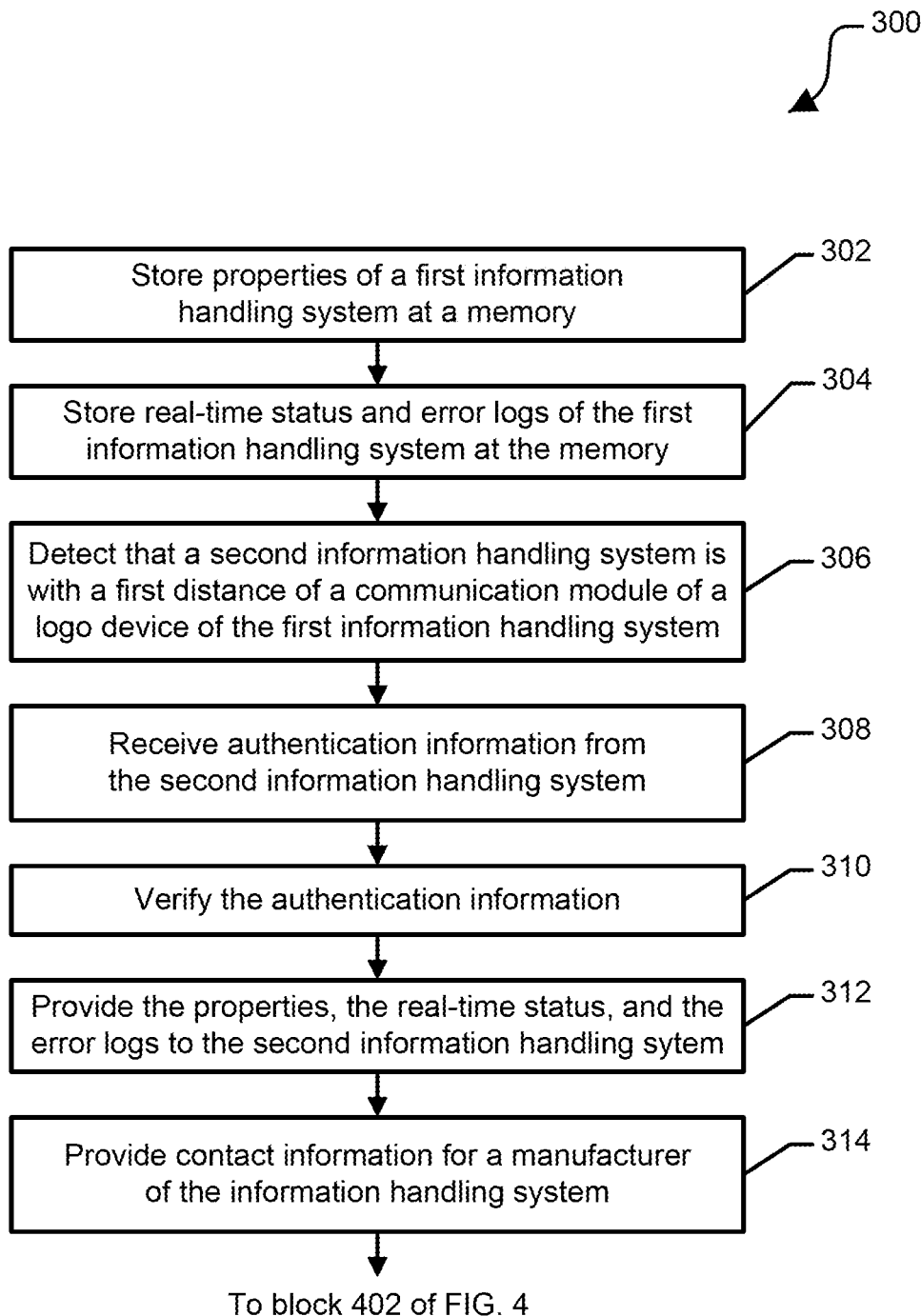
FIG. 3 is a flow diagram illustrating a method for providing properties of a first information handling system to a second information handling system according to an embodiment of the present disclosure.

FIG. 3 illustrates a flow diagram of a method 300 for providing properties of a first information handling system to a second information handling system according to an embodiment of the present disclosure. At block 302, properties of the first information handling system are stored at a memory of a logo device. In an embodiment, the logo device is located within the first information handling system, and the memory is integrated within the logo device. In an embodiment, the properties of the first information handling system are stored at the memory during a manufacturing process of the first information handling system. In an embodiment, the properties include a service or asset tag, a model number, a serial number, or the like of the first information handling system.

At block 304, real-time status and error logs of the first information handling system are stored at the memory. In an embodiment, the real-time status and the error logs can be associated with other components within the information handling system, and the real-time status and the error logs can be continuously updated. A second information handling system is detected within a first distance of a communication device of the logo device at block 306. In an embodiment, the first distance can be any distance within the distance of a communication range for the communication device. For example, the second information handling system is within the first distance from the communication device in response to the second information handling system being tapped, or placed in physical communication, with a logo of the logo device. In an embodiment, the logo is located on an external surface of the logo device, and is visible from outside of the information handling system At block 308, authentication information is received from the second information handling system. In an embodiment, the second information handling system can continually broadcast the authentication information. The authentication information is verified at block 310. At block 312, properties, the real-time status, and the error logs for the first information handling system are provided in response to the second information handling system being within the first distance. Contact information for a manufacturer of the first information handling system is provided to the second information handling system in response to the second information handling system being within the first distance at block 314, and the flow continues at block 402 of FIG. 4. In an embodiment, the properties, the real-time status, the error logs, and the contact information for the first information handling system can be provided to the second information handling system while the components within the logo device have power but the other components of the first information handling system are powered down.

Figure 4:
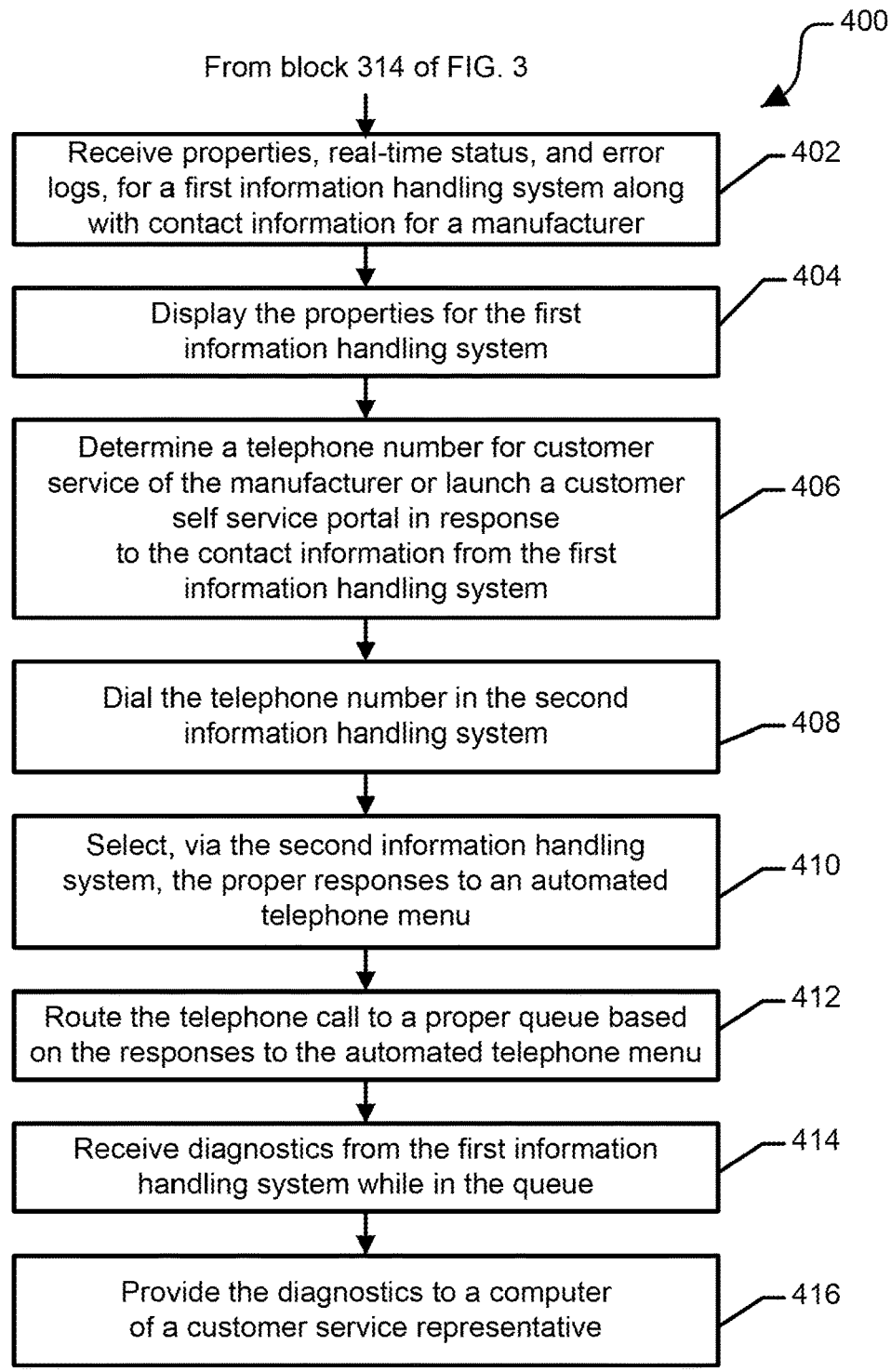
FIG. 4 is a flow diagram illustrating another method for receiving and utilizing the properties of the first information handling system in the second information handling system according to an embodiment of the disclosure.

FIG. 4 illustrates a flow diagram of a method 400 for receiving and utilizing the properties of the first information handling system in the second information handling system according to an embodiment of the disclosure. At block 402, properties, real-time status, and error logs for a first information handling system, and contact information for a manufacturer of the first information handling system are received at a second information handling system. In an embodiment, this information can be received at the second information handling system in response to the second information handling system being placed within a first distance from a logo of the first information handling system. In an embodiment, the properties include a service or asset tag, a model number, a serial number, or the like of the first information handling system. In an embodiment, the real-time status and the error logs can be associated with other components within the information handling system, and the real-time status and the error logs can be continuously updated.

At block 404, the properties for the first information handling system are displayed on a screen of the second information handling system. A telephone number for customer service of the manufacturer is determined or a customer self service portal is launched on the second information handling system in response to the contact information at block 406. In an embodiment, a user can utilize the customer self service portal to renew a warranty on the first information handling system, to check assets or component registered with the manufacturer of the first information handling system, search for support, or the like. In an embodiment, the second information handling system can automatically detect the telephone number from the received contact information. At block 408, the telephone number is dialed by the second information handling system. In an embodiment, the second information handling system can be a smart telephone, or any other device capable of making telephone calls. In an embodiment, the second information handling system can automatically dial the telephone number without user interaction. In an embodiment, the second information handling system can dial the telephone number after a user selects the telephone number.

At block 410, the second information handling system automatically selects the proper responses to an automated telephone menu. In an embodiment, the second information handling system determines the proper responses based on the properties, real-time status, and error logs for the first information handling system. For example, the second information handling system can search the properties, real-time status, and error logs for the first information handling system to determine keys words that identify the proper responses.

At block 412, the telephone call is routed to a proper queue for a customer service representative based on the responses to the automated telephone menu. Diagnostics about the first information handling system are received at the second information while the telephone call is in the queue at block 414. At block 416, the diagnostics are provided to a computer of a customer service representative in response to the telephone call being answered by the customer service representative. In an embodiment, the second information handling system can send the diagnostics based on the contact information. For example, the contact information can include an electronic mail address for the customer service center, individual electronic mail addresses for different customer service representatives, or the like.

Figure 5:
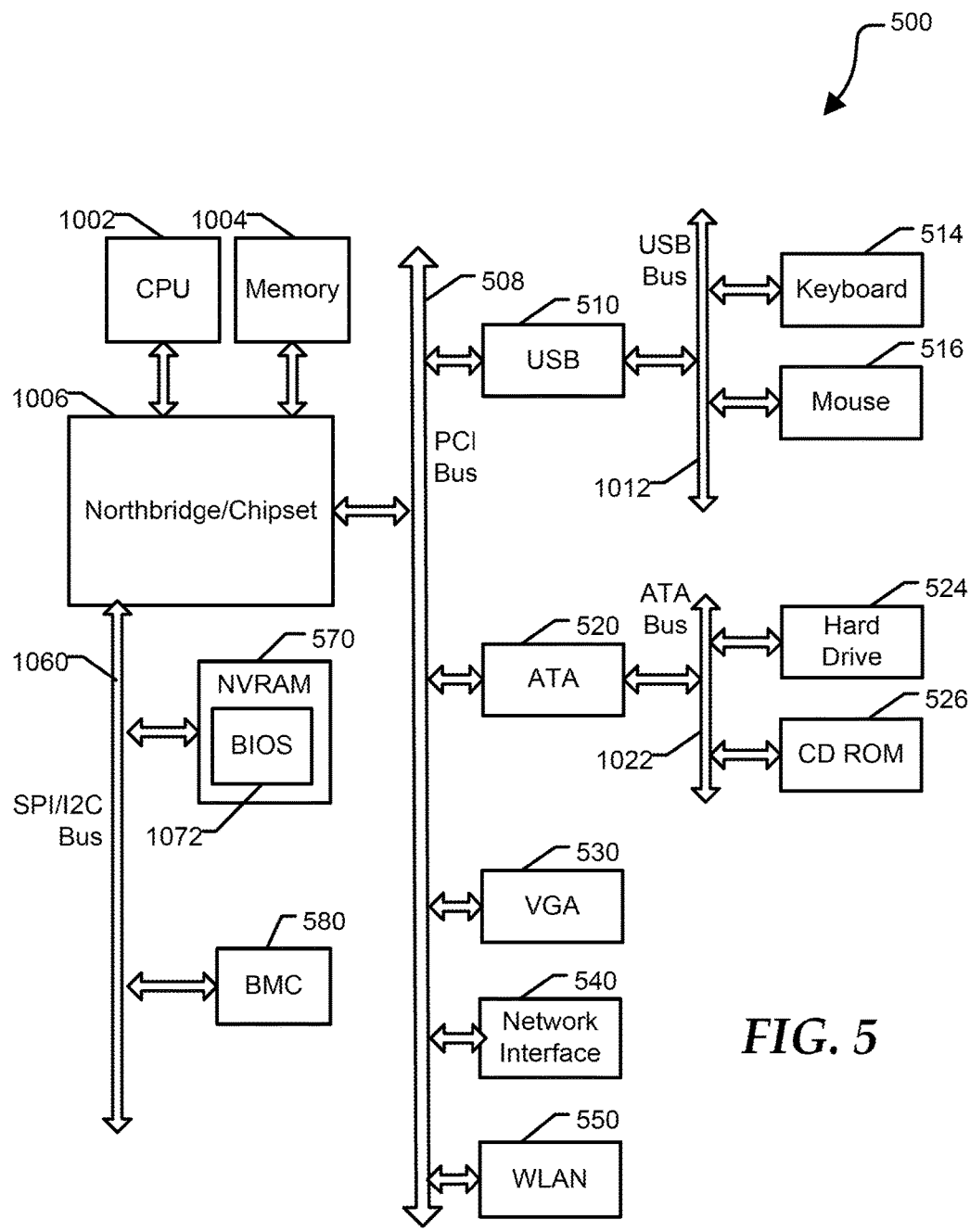
FIG. 5 is a block diagram of a general information handling system according to an embodiment of the present disclosure.

FIG. 5 shows an information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors (not shown at FIG. 1) that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 50.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, i.e. a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    storing, at a memory of a logo device, real-time status and error logs of a first information handling system, wherein the memory is integrated within the logo device of the first information handling system, wherein the logo device includes a logo on an external surface of the logo device, and the logo is visible from outside of the first information handling system to identify a location of the logo device within the first information handling system;
    detecting that a second information handling system is placed in communication with the logo device;
    receiving, at a communication device of the logo device, authentication information from the second information handling system in response to the second information handling system being placed in communication with the logo device;
    verifying the authentication information;
    in response to verifying the authentication information, providing the real-time status, contact information for a manufacturer, and the error logs for the first information handling system;
    determining whether additional diagnostics can be retrieved while a communication to the manufacturer has been initiated by the second information handling system using the contact information in response to the second information handling system determining an error has occurred based on the error logs; and
    in response to determining whether the additional diagnostics can be retrieved, providing the additional diagnostics to the second information handling system to be sent to the manufacturer during the communication in addition to the real-time status and the error logs.

2. The method of claim 1, further comprising:
    providing contact information for a manufacturer of the first information handling system to the second information handling system along with the real-time status and the error logs.

3. The method of claim 1, further comprising:
    providing, via a battery within the logo device, power to the memory and the communication device of the logo device while components of the first information handling system is powered off.

4. The method of claim 1, further comprising:
    storing, at the memory, properties of the first information handling system during a manufacturing process of the first information handling system.

5. The method of claim 1, further comprising:
    launching a customer self service portal on the second information handling system in response to verifying the authentication information.

6. A method comprising:
    storing, at a memory of a logo device, properties of a first information handling system, wherein the memory is integrated within the logo device of the first information handling system, wherein the logo device includes a logo on an external surface of the logo device, and the logo is visible from outside of the first information handling system to identify a location of the logo device within the first information handling system;
    detecting that a second information handling system is placed in communication with the logo device;
    receiving, at a communication device of the logo device, authentication information from the second information handling system in response to the second information handling system being placed in communication with the logo device;
    verifying the authentication information;
    in response to verifying the authentication information, providing the properties, contact information of a manufacturer, real-time status, and error logs of the first information handling system to the second information handling system;
    determining whether additional diagnostics can be retrieved while a communication to the manufacturer has been initiated by the second information handling system using the contact information in response to the second information handling system determining an error has occurred based on the error logs; and
    in response to determining whether the additional diagnostics can be retrieved, providing the additional diagnostics to the second information handling system to be sent to the manufacturer during the communication in addition to the real-time status and the error logs.

7. The method of claim 6, further comprising:
    storing real-time status and error logs of the first information handling system at the memory.

8. The method of claim 6, further comprising:
    storing the real-time status and the error logs of the first information handling system at the memory prior to power down of the first information handling system.

9. The method of claim 6, further comprising:
    providing, via a battery within the logo device, power to the memory and the communication device of the logo device while components of the first information handling system is powered off.

10. The method of claim 6, wherein the properties of the first information handling system are stored at the memory during a manufacturing process of the first information handling system.

11. The method of claim 6, further comprising:
launching a customer self service portal on the second information handling system in response to verifying the authentication information.

12. An information handling system comprising:

a plurality of components; and a logo device configured to communicate with one of the components, the logo device including:

- a logo on an external surface of the logo device, wherein the logo is visible from outside of the information handling system to identify a location of the logo device within the information handling system;
- a memory to store real-time status and error logs of the information handling system;
- a communication device to receive authentication information from a second information handling system in response to the second information handling system being placed in communication with the logo device; and
- a processor configured to communicate with the memory and with the communication device, the processor to detect that a second information handling system being placed in communication with the logo device, to verify the authentication information, to provide contact information of a manufacturer, the real-time status, and the error logs for the information handling system in response to verifying the authentication information, to determine whether additional diagnostics can be retrieved while a communication to the manufacturer has been automatically initiated by the second information handling system using the contact information in response to a determination by the second information handling system that an error has occurred based on the error logs, and in response to the determination that the additional diagnostics can be retrieved, and to provide the additional diagnostics to the second information handling system to be sent to the manufacturer during the communication in addition to the real-time status and the error logs.

13. The information handling system of claim 12, the memory further to store properties of a first information handling system during a manufacturing process of the first information handling system.

14. The information handling system of claim 12, the processor further to provide properties of the information handling system to the second information handling system in response to verifying the authentication information.

15. The information handling system of claim 12, the processor further to launch a customer self service portal on the second information handling system in response to verifying the authentication information.

16. The information handling system of claim 12, wherein the logo device further includes:

a battery to power to the memory and the communication device while the components of the information handling system is powered off.

17. The information handling system of claim 12, wherein the contact information being provided to the second information handling system enabled the second information handling system to automatically dial a customer service telephone number of the manufacturer.

* * * * *